US011622503B2

(12) United States Patent
Ludwig et al.

(10) Patent No.: US 11,622,503 B2
(45) Date of Patent: Apr. 11, 2023

(54) RIDING LAWN MOWER

(71) Applicant: Andreas Stihl AG & Co. KG, Waiblingen (DE)

(72) Inventors: Werner Ludwig, Brannenburg (DE); Christian Rohrmoser, Angerberg (AT)

(73) Assignee: Andreas Stihl AG & Co. KG, Waiblingen (DE)

(*) Notice: Subject to any disclaimer, the term of this patent is extended or adjusted under 35 U.S.C. 154(b) by 173 days.

(21) Appl. No.: 17/145,427

(22) Filed: Jan. 11, 2021

(65) Prior Publication Data
US 2021/0219492 A1 Jul. 22, 2021

(30) Foreign Application Priority Data

Jan. 17, 2020 (EP) ..................................... 20152432

(51) Int. Cl.
*A01D 34/82* (2006.01)
*A01D 34/71* (2006.01)
(Continued)

(52) U.S. Cl.
CPC ......... *A01D 34/826* (2013.01); *A01D 34/001* (2013.01); *A01D 34/71* (2013.01);
(Continued)

(58) Field of Classification Search
CPC .......... F01N 13/141; F01N 13/16; F01N 1/00; F01N 2240/20; F01N 2260/20;
(Continued)

(56) References Cited

U.S. PATENT DOCUMENTS 3,601,611 A * 8/1971 Kendall ..................... G01J 5/08
250/353
5,373,119 A * 12/1994 Suzuki .................. F01N 13/002
60/299
(Continued)

FOREIGN PATENT DOCUMENTS

DE G 88 07 068.9 6/1989
EP 1 099 830 5/2001
(Continued)

OTHER PUBLICATIONS

Snapper. ("Oregon 35-050 Snapper 7-4753[783] Small Engine Muffler" on Amazon), noting first availability of part on Feb. 3, 2015. Retrieved from the web address contained in the next two NPL entries (character limit on form was exceeded) (Year: 2015).*

(Continued)

*Primary Examiner* — Mickey H France
(74) *Attorney, Agent, or Firm* — Gudrun E. Huckett

(57) ABSTRACT

A riding lawn mower has an internal combustion engine and a muffler with a first housing. The internal combustion engine is connected to the muffler to supply exhaust gases originating from the internal combustion engine to the first housing of the muffler for noise damping of the exhaust gases. A second housing is provided that thermally insulates the first housing of the muffler. The second housing at least partially encloses the first housing of the muffler. The second housing has an exterior side with an emissivity of greater than 0.8.

19 Claims, 7 Drawing Sheets

(51) Int. Cl.
*F01N 13/14* (2010.01)
*F01N 13/00* (2010.01)
*A01D 34/00* (2006.01)
*A01D 75/00* (2006.01)
*A01D 75/18* (2006.01)
*A01D 75/20* (2006.01)
*F01N 13/16* (2010.01)
*A01D 101/00* (2006.01)
*F01N 1/00* (2006.01)

(52) U.S. Cl.
CPC ............ *A01D 75/00* (2013.01); *A01D 75/18* (2013.01); *A01D 75/20* (2013.01); *F01N 13/00* (2013.01); *F01N 13/002* (2013.01); *F01N 13/14* (2013.01); *F01N 13/141* (2013.01); *F01N 13/16* (2013.01); *A01D 2101/00* (2013.01); *F01N 1/00* (2013.01); *F01N 2240/20* (2013.01); *F01N 2260/20* (2013.01); *F01N 2530/06* (2013.01); *F01N 2590/00* (2013.01)

(58) Field of Classification Search
CPC ............ F01N 2530/06; F01N 2590/00; F01N 13/1805; F01N 13/1838; F01N 13/00; F01N 13/002; F01N 13/14; A01D 2101/00; A01D 34/826; A01D 34/001; A01D 34/71; A01D 75/00; A01D 75/18; A01D 75/20
See application file for complete search history.

(56) References Cited

U.S. PATENT DOCUMENTS

| | | | | |
|---|---|---|---|---|
| 6,026,768 | A * | 2/2000 | Spitler | B60K 13/04 123/41.58 |
| 2007/0104859 | A1* | 5/2007 | Featherby | C23C 26/00 106/632 |
| 2013/0263582 | A1 | 10/2013 | Mayefsky | |
| 2016/0115933 | A1* | 4/2016 | Koenen | A01D 34/001 290/38 R |
| 2017/0030263 | A1* | 2/2017 | Rowe | F01N 13/082 |
| 2019/0360379 | A1* | 11/2019 | Hangwu | F01N 13/002 |

FOREIGN PATENT DOCUMENTS

| | | |
|---|---|---|
| FR | 2 275 136 | 1/1976 |
| FR | 2 858 356 | 2/2005 |
| GB | 2470390 | 11/2010 |

OTHER PUBLICATIONS https://www.amazon.ca/Oregon-35-050-Snapper-7-4753-Muffler/dp/B0018U29JQ/refd_pd_day0_sccl_3_1/130-7295911-2464036?pd_rd_w=6Xuby&content-id=amzn1.sym.a0f07c06-3bfe-427e-9527-5be8cea27b66&pf_rd_p=a0f07c06-3bfe-427e-9527- (Year: 2015).*
5be8cea27b66&pf_rd_r=GW1J67PEJYWG0STYD026&pd_rd_wg=PBq1V&pd_rd_r=59d05386-d448-4479-9914-f2c1df2a05b0& pd_rd_i=B0018U29JQ&psc=1 (Year: 2015).*
Snapper Mower. Ebay listing from 9 years ago, depicting Snapper riding lawnmower. See web link in file.*

* cited by examiner

RIDING LAWN MOWER

BACKGROUND OF THE INVENTION

The invention relates to a riding lawn mower comprising an internal combustion engine and a muffler, wherein the internal combustion engine is connected to the muffler for introducing exhaust gases into the latter, wherein the muffler comprises a first housing into which exhaust gases can be introduced for noise-damping.

Due to the exhaust gases introduced into the muffler, the housing of a muffler becomes very hot in operation. In riding lawn mowers, the muffler is generally arranged in front of the axle of the front wheels at the level of the axle. Upon contact of the hot muffler housing with dry cut material, for example, there is the risk of ignition of the dry cut material due to the great heat of the muffler housing.

It is therefore the object of the invention to further develop a riding lawn mower of the aforementioned kind in such a way that the ignition danger originating from the riding lawn mower is minimized.

SUMMARY OF THE INVENTION

In accordance with the invention, this object is solved in that the riding lawn mower comprises a second housing for thermal insulation of the first housing, wherein the second housing at least partially encloses the first housing, and wherein the second housing at its exterior side has an emissivity of greater than 0.8, in particular of greater than 0.9.

Accordingly, it is provided that the riding lawn mower comprises a second housing for thermal insulation of the first housing. The first housing is also referred to as muffler housing. The second housing is also referred to as insulating housing. The second housing encloses the first housing at least partially. The second housing comprises at its exterior side an emissivity of greater than 0.8, in particular of greater than 0.9.

It has been found that a second housing that at least partially surrounds the first housing has a reduced temperature at its exterior side in operation of the muffler compared to the first housing of a riding lawn mower of the aforementioned kind at otherwise identical operating conditions. This is surprising inasmuch as one would expect that the second housing due to thermal radiation originating from the first housing would heat up correspondingly and that the heat would even build up in the second housing so that it would become even hotter. Since the second housing as its exterior side has an emissivity of greater than 0.8, in particular of greater than 0.9, the second housing can dissipate heat quickly to the environment. The emissivity of a body indicates how much radiation it can emit in comparison to an ideal thermal radiator, a black body. Due to the quick heat dissipation of the second housing, the temperature of the exterior side of the second housing is maintained at a comparatively low value. As a whole, a safe operation of the riding lawn mower is possible. The risk of ignition of dry cut material by means of the muffler or the riding lawn mower is minimized.

Advantageously, the second housing encloses the first housing in such a way that the second housing, with respect to a point inside the first housing, covers a solid angle range of at least 70%, in particular of at least 90%, of the entire solid angle. The entire solid angle amounts to 4π sr. In this way, the second housing covers the first housing across a large region. The term "cover" is to be understood here such that a part of the first housing as well as a part of the second housing are positioned along a straight line beginning at the point inside the first housing. In particular, the term "cover" does not mean that the second housing is contacting the first housing or is touching the first housing.

In an advantageous further embodiment of the invention, the second housing encloses the first housing completely with the exception of openings in the second housing for the at least one connecting line and for an exhaust gas outlet. In this way, cut material can penetrate only through the opening for the exhaust gas outlet toward the first housing of the muffler. Deposits of cut material in the region of the first housing are hardly possible. The risk of an ignition of cut material or other things by contact with the first housing of the muffler is thus minimized.

Expediently, an insulation distance is provided between the first housing and the second housing. In this way, heat transmission from the first housing to the second housing is made difficult. When positioning the riding lawn mower on a horizontal plane, the first housing comprises a vertical height. Advantageously, the insulation distance that is measured perpendicularly to a wall of the second housing amounts to at least 5%, in particular at least 10%, of the vertical height. Expediently, the insulation distance amounts to at least 5 mm, in particular at least 8 mm. In this way, the second housing can be of a compact configuration while providing a good insulation effect at the same time.

In an advantageous further embodiment of the invention, it is provided that the riding lawn mower comprises a support, that the support is fastened at the second housing, and that the support carries the muffler. In this way, the first housing of the muffler can be arranged in the second housing in such a way that a heat transmission from the first housing to the second housing by thermal conduction is possible only through the support. In this way, the contribution of thermal conduction to the entire heat transmission can be very minimal due to appropriate dimensioning of the support.

In a particular embodiment of the invention, a top side of the second housing is formed by a deflection surface for avoiding collection of cut material. In this way, it is prevented that cut material collects on the top side of the second housing and can be heated or ignited thereat. In this way, the risk of ignition of cut material is minimized. Advantageously, the deflection surface is at least partially rounded. Expediently, the deflection surface is an at least partially convex surface.

In an advantageous further embodiment of the invention, it is provided that the second housing is black at its exterior side. In this way, the thermal energy of the second housing can be dissipated particularly well to the environment by thermal radiation. In this way, excessive heating of the second housing can be prevented.

Advantageously, the second housing comprises at its inner side an emissivity of less than 0.25, in particular of less than 0.15. Accordingly, the second housing absorbs at its inner side a particularly small amount of thermal radiation. Accordingly, the second housing heats up only to a comparatively minimal degree. Due to the low emissivity, the proportion of reflected thermal radiation is particularly high. The thermal radiation which is impinging on the inner side of the second housing is reflected and turned back to the first housing. From there, it can be dissipated together with the exhaust gases that are being passed through the muffler.

Advantageously, the wall of the second housing is comprised of aluminum. The low density of aluminum leads to a high thermal capacity. In this way, the heat distributes uniformly. There is no after-heating phase. Cooling begins at once.

Expediently, the wall of the second housing at the inner side of the second housing is uncoated. This leads to the low emissivity and the thus associated low absorption of thermal radiation by the second housing at its inner side.

In an advantageous embodiment of the invention, it is provided that the opening of the second housing for the exhaust gas outlet is arranged laterally viewed in travel direction of the riding lawn mower. In this way, when driving onto an easily ignitable obstacle with the riding lawn mower, the greatest heat in the form of exhaust gases is not guided directly onto the obstacle. Instead, the exhaust gases can escape laterally viewed in travel direction. In this way, the risk of ignition of the obstacle is lowered.

Advantageously, the internal combustion engine is connected by means of at least one connecting line to the muffler for passing exhaust gases into the latter.

BRIEF DESCRIPTION OF THE DRAWING

Embodiments of the invention will be explained in the following with the aid of the drawings.

DESCRIPTION OF THE PREFERRED EMBODIMENTS

Figure 1:
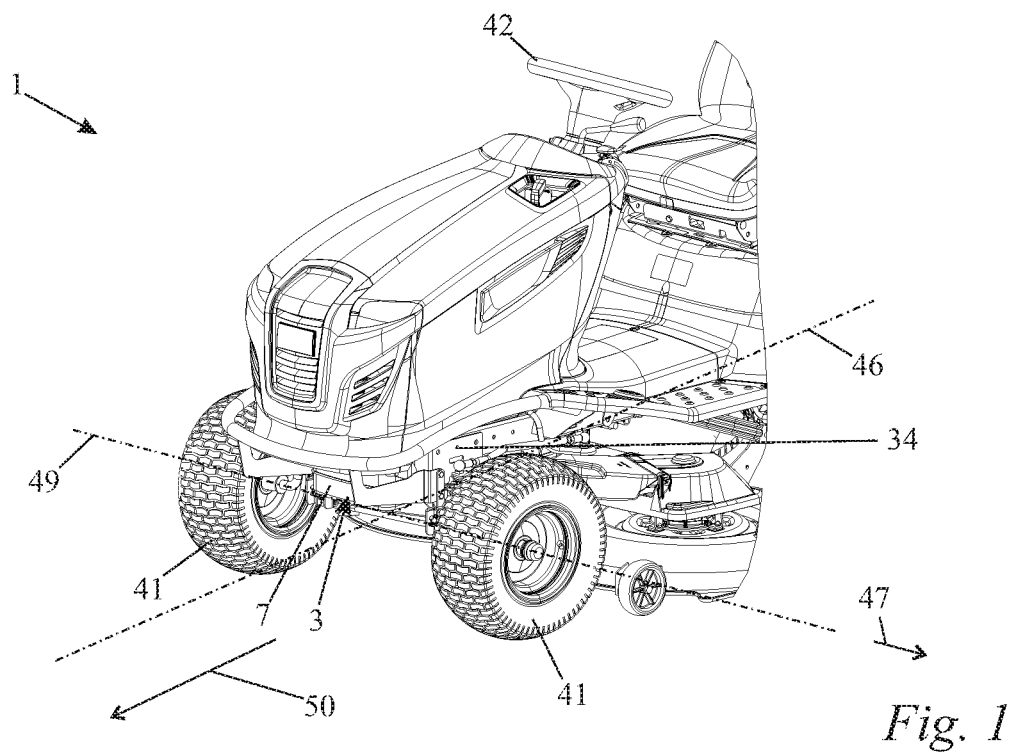
FIG. 1 shows a perspective partial illustration of a riding lawn mower with a muffler in a second housing.

FIG. 1 shows a riding lawn mower 1. The riding lawn mower 1 comprises front wheels 41. The front wheels 41 can be steered by means of a steering wheel 42. When the riding lawn mower 1 is traveling straight ahead, the riding lawn mower 1 travels in travel direction 50. The travel direction 50 extends in the direction of a longitudinal center axis 46 of the riding lawn mower 1. When the riding lawn mower 1 is traveling straight ahead, the front wheels 41 rotate about a common axis of rotation 49. The axis of rotation 49 extends perpendicularly to the longitudinal center axis 46. In the travel direction 50 in front of the axis of rotation 49, a muffler 3 is arranged which is enclosed in a second housing 7. The muffler 3 is arranged at the level of the axis of rotation 49. The muffler 3 is not visible in FIG. 1.

Figure 2:
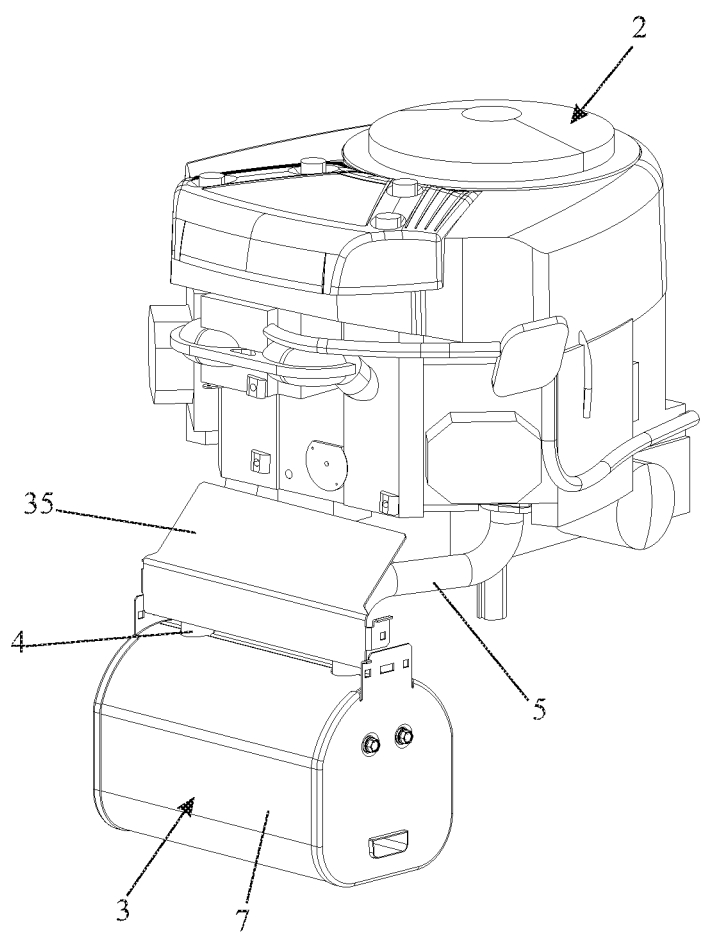
FIG. 2 shows a perspective illustration of the second housing and of the internal combustion engine of FIG. 1.

As illustrated in FIG. 2, the muffler 3 is connected by a connecting line 4 to an internal combustion engine 2. The muffler 3 (not visible in FIG. 2) is arranged in the second housing 7. In the embodiment according to FIG. 2, the muffler 3 is additionally connected by a connecting line 5 to the internal combustion engine 2. The connecting lines 4, 5 are elbows, respectively. By means of the connecting lines 4, 5, exhaust gases of the internal combustion engine 2 are passed into the muffler 3. Each one of the connecting lines 4 and 5 is correlated to one cylinder of the internal combustion engine 2. The muffler 3 is positioned at a distance from the internal combustion engine 2. Between the second housing 7 and the internal combustion engine 2, a heat shield 35 is arranged. The heat shield 35 shields at least partially thermal radiation between the second housing 7 and the internal combustion engine 2.

Figure 3:
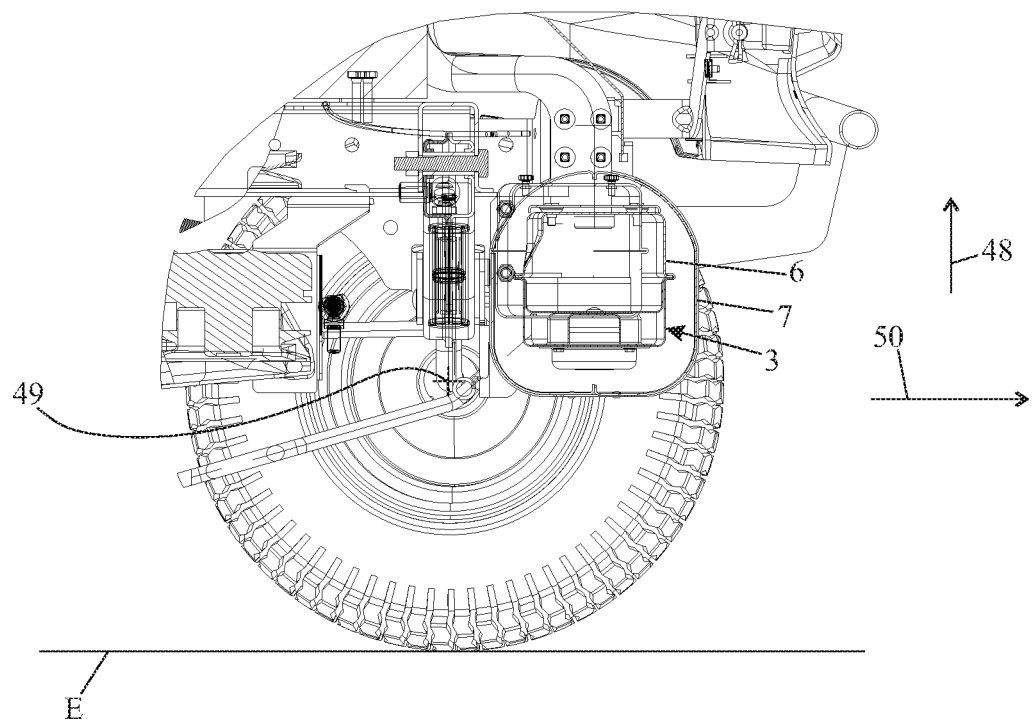
FIG. 3 shows a section view of the riding lawn mower of FIG. 1 and in particular of the muffler of FIG. 1, wherein the section plane extends in the travel direction of the riding lawn mower.

As can be seen in FIG. 3, the muffler 3 comprises a first housing 6. The exhaust gases can be introduced for noise damping into the first housing 6 of the muffler 3. The riding lawn mower 1 comprises a second housing 7. The second housing 7 serves for thermal insulation of the first housing 6 of the muffler 3. The second housing 7 encloses the first housing 6 at least partially.

When positioning the riding lawn mower 1 on a horizontal plane E, the first housing 6 of the muffler 3 is arranged at a greater distance from the horizontal plane E than the second housing 7. With respect to a vertical direction 48, which is positioned perpendicularly to the horizontal plane E, the first housing 6 of the muffler 3 is arranged higher than the axis of rotation 49. The second housing 7 is positioned in relation to the vertical direction 48 mostly above the axis of rotation 49.

Figure 4:
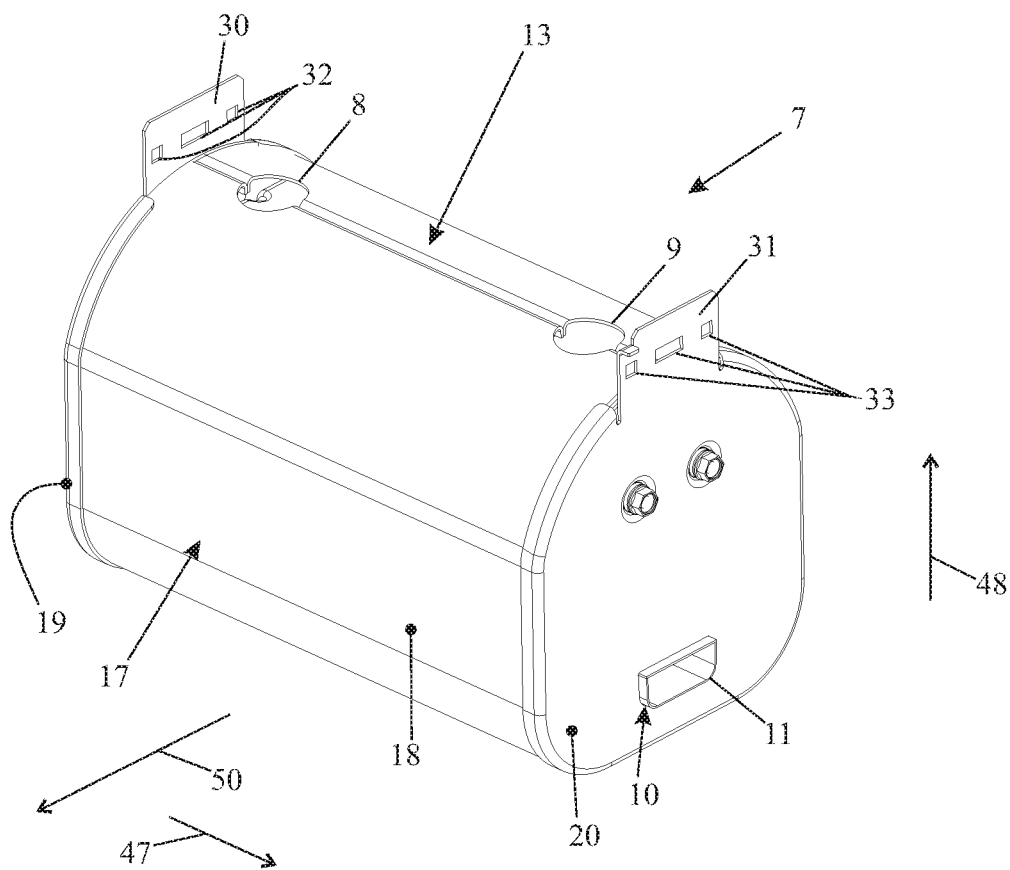
FIG. 4 is a perspective illustration of the second housing of FIGS. 1 to 3.

As illustrated in FIG. 4, the second housing 7 comprises openings 8, 9, and 10. The opening 8 is provided for the connecting line 4. The opening 9 is provided for the connecting line 5. The opening 10 is provided for the exhaust gas outlet 11 of the muffler 3. The opening 10 for the exhaust gas outlet 11 is arranged laterally in relation to the travel direction 50 of the riding lawn mower 1. The exhaust gas outlet 11 penetrates the opening 10.

The second housing 7 comprises a wall 17. The wall 17 is comprised of aluminum. The wall 17 is formed by a center part 18 and by two side parts 19, 20. The side parts 19, 20 are positioned opposite each other in regard to an axial direction 47. The axial direction 47 extends in the direction of the axis of rotation 49. The axial direction 47 is positioned perpendicularly to the travel direction 50 and perpendicularly to the vertical direction 48. The center part 18 of the wall 17 connects the two side parts 19 and 20 to each other. The openings 8 and 9 for the connecting lines 4 and 5 are arranged in the center part 18 of the wall 17. The opening 10 for the exhaust gas outlet 11 is arranged at the side part 20.

The second housing 7 comprises a top side 13. When positioning the riding lawn mower 1 on the horizontal plane E, the top side 13 of the second housing 7 is facing away from the horizontal plane E. The top side 13 of the second housing 7 is facing upwardly in regard to the vertical direction 48. The top side 13 of the second housing 7 comprises the upper half of the second housing 7 in relation to the vertical direction 48. The openings 8, 9 are arranged in the top side 13 of the second housing 7. The top side 13 of the second housing 7 comprises a top side of the center part 18 of the wall 17.

Figure 5:
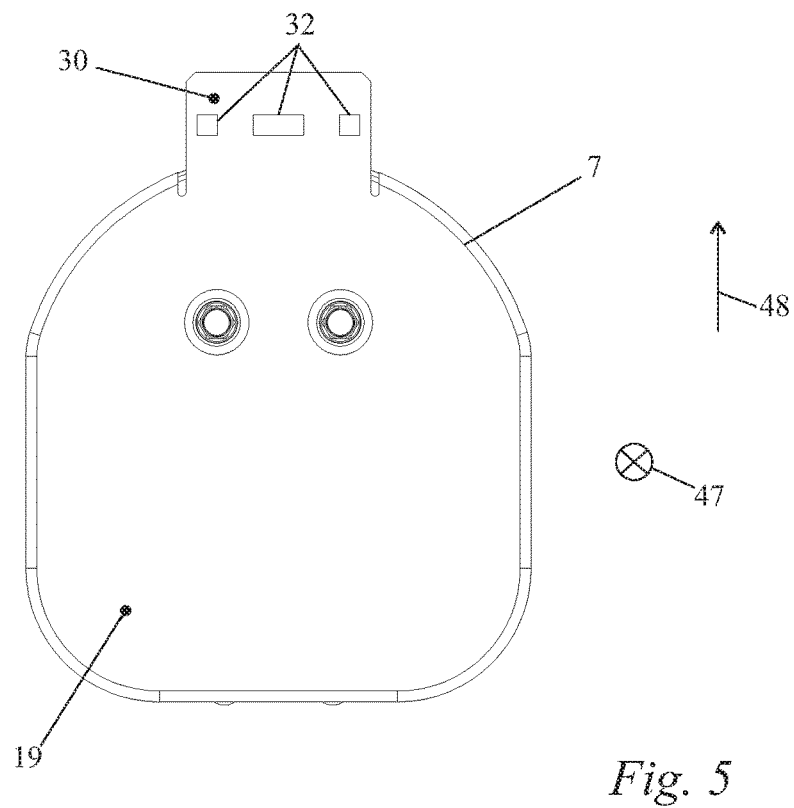
FIG. 5 is an end view of the second housing of FIG. 4.

FIG. 5 shows a side view of the exterior side of the side part 19 of the wall 17 in axial direction 47. At the upper end in relation to the vertical direction 48, the side part 19 comprises a tab 30. The tab 30 comprises three fastening openings 32. In an analogous manner, the side part 20 illustrated in FIG. 4 comprises a tab 31. The tab 31 comprises three fastening openings 33. The tabs 30, 31 project upwardly past the center part 18 of the wall 17 in the vertical direction 48.

By means of at least one fastening opening 32 of the tab 30 and by means of at least one fastening opening 33 of the tab 31, the second housing 7 is fastened to the base body 34 of the riding lawn mower 1 illustrated in FIG. 1. The second housing 7 is suspended from the base body 34 of the riding lawn mower 1.

Figure 6:
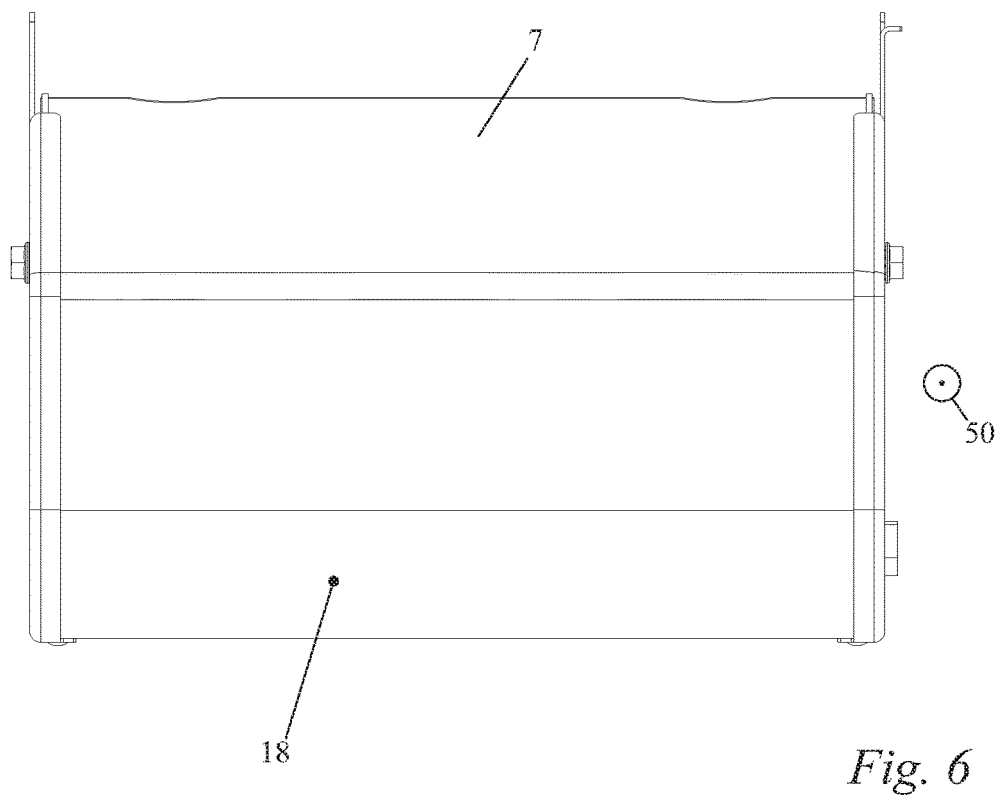
FIG. 6 is a side view of the second housing of FIG. 4.
Figure 7:
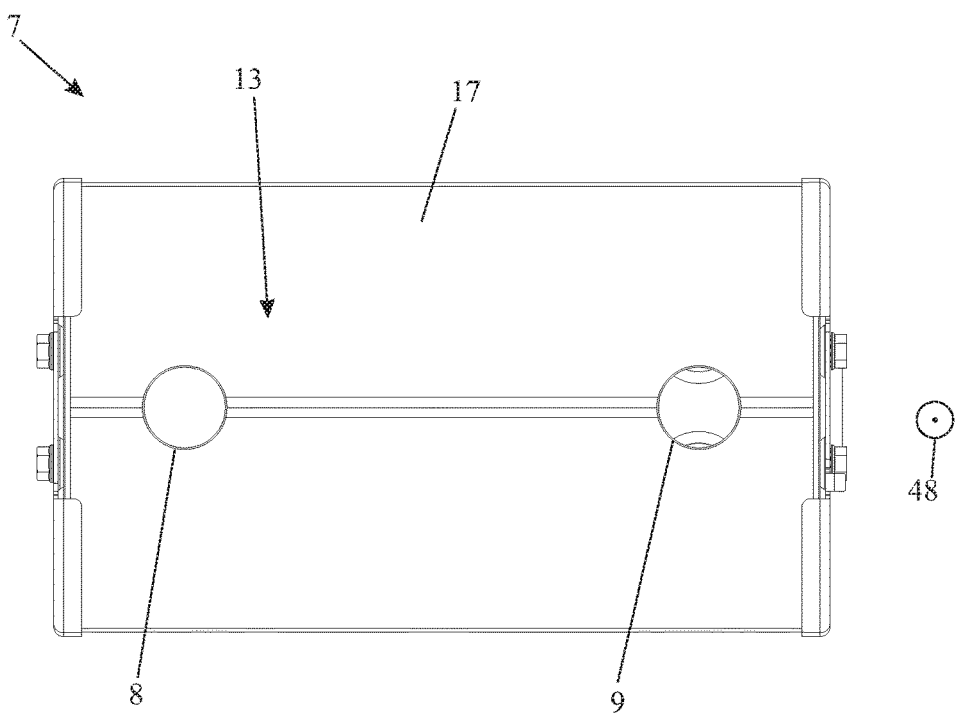
FIG. 7 is a plan view of the second housing of FIG. 4.
Figure 8:
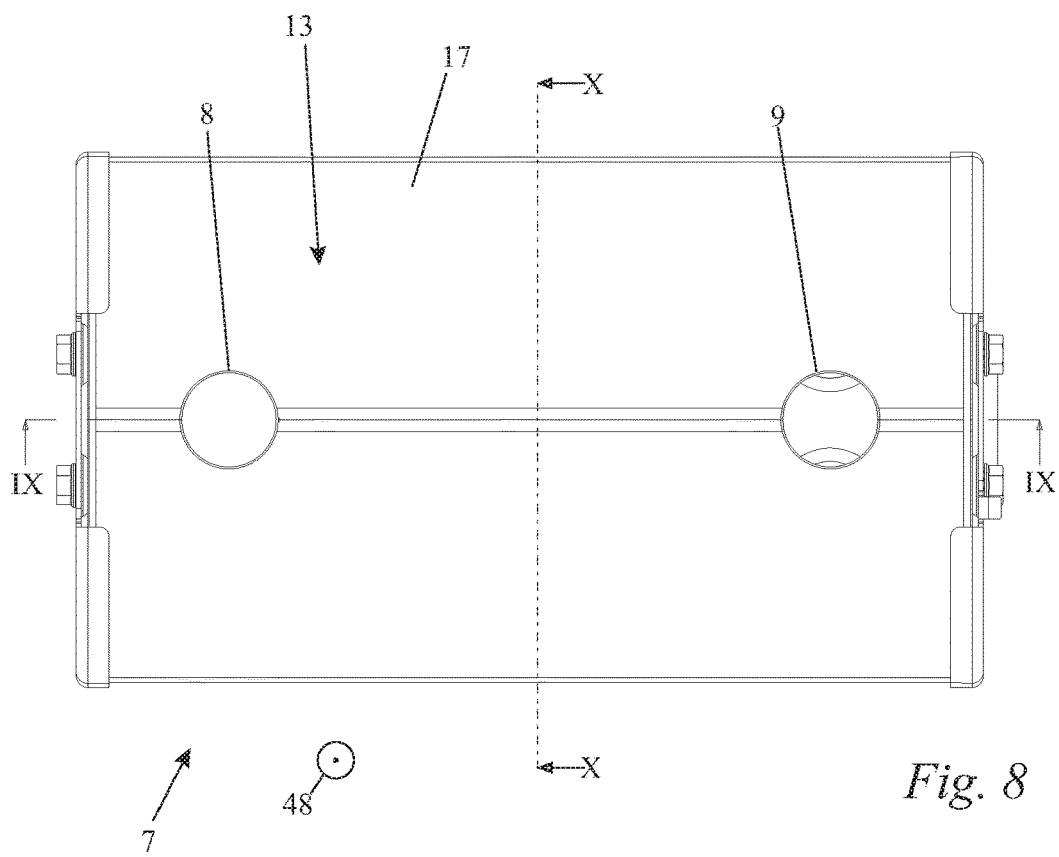
FIG. 8 is a further plan view of the second housing of FIG. 4 showing section planes.

FIG. 6 shows a side view of the center part 18 of the wall 17 of the second housing 7 in the direction opposite to the travel direction 50. FIGS. 7 and 8 show a plan view of the second housing 7 in the direction opposite to the vertical direction 48. The openings 8, 9 completely penetrate the wall 17 at the top side 13 of the second housing 7 in the vertical direction 48.

Figure 9:
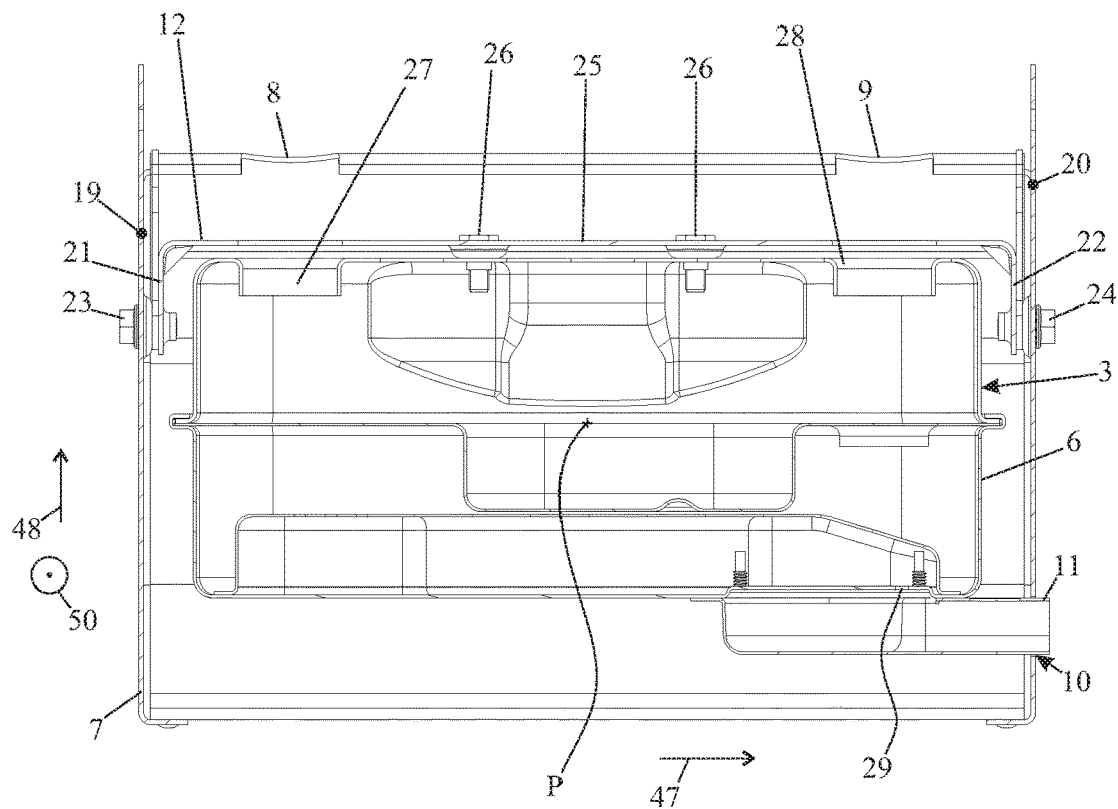
FIG. 9 is a section view of the second housing and of the muffler of FIG. 8 along the section plane IX-IX of FIG. 8.
Figure 10:
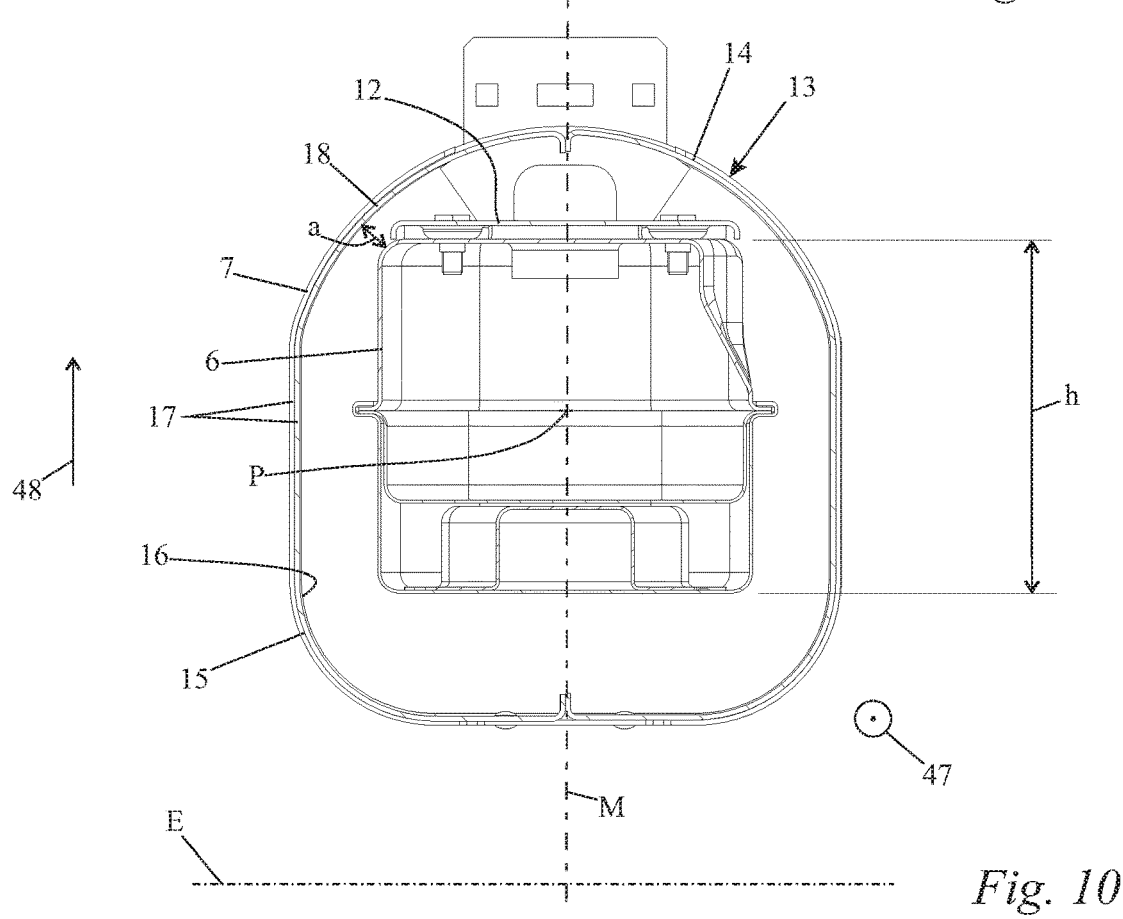
FIG. 10 is a section view of the second housing and of the muffler of FIG. 8 along the section plane X-X of FIG. 8.
Figure 11:
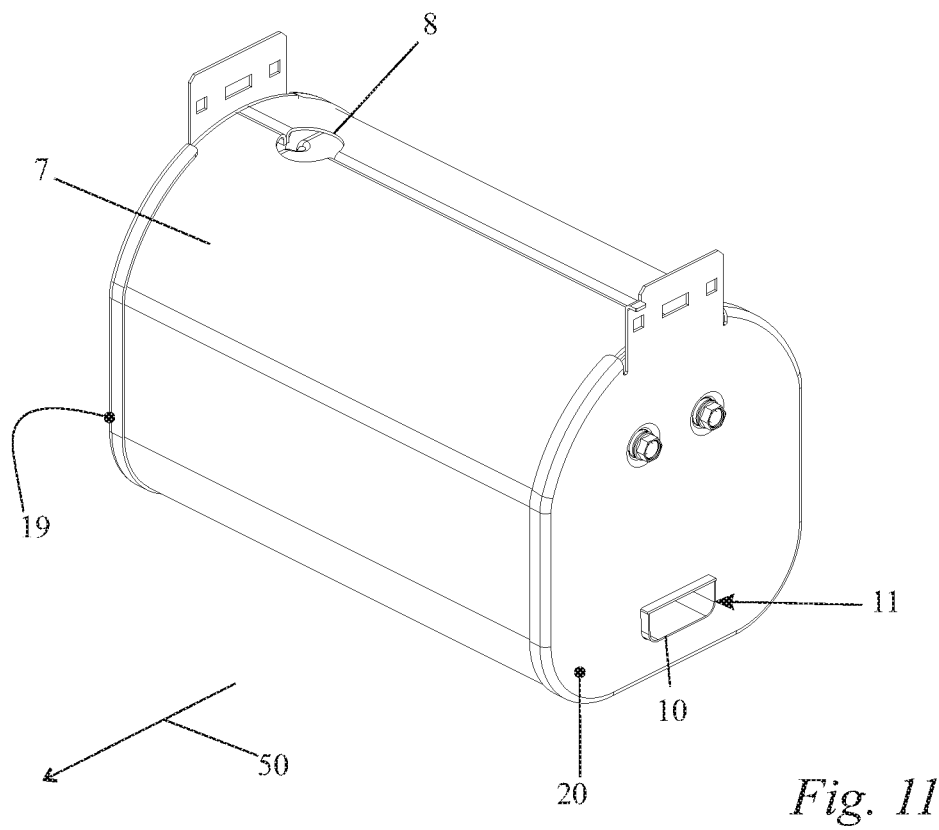
FIG. 11 is a perspective illustration of an alternative embodiment of a second housing provided with a single opening for a connecting line for connecting to the internal combustion engine.
Figure 12:
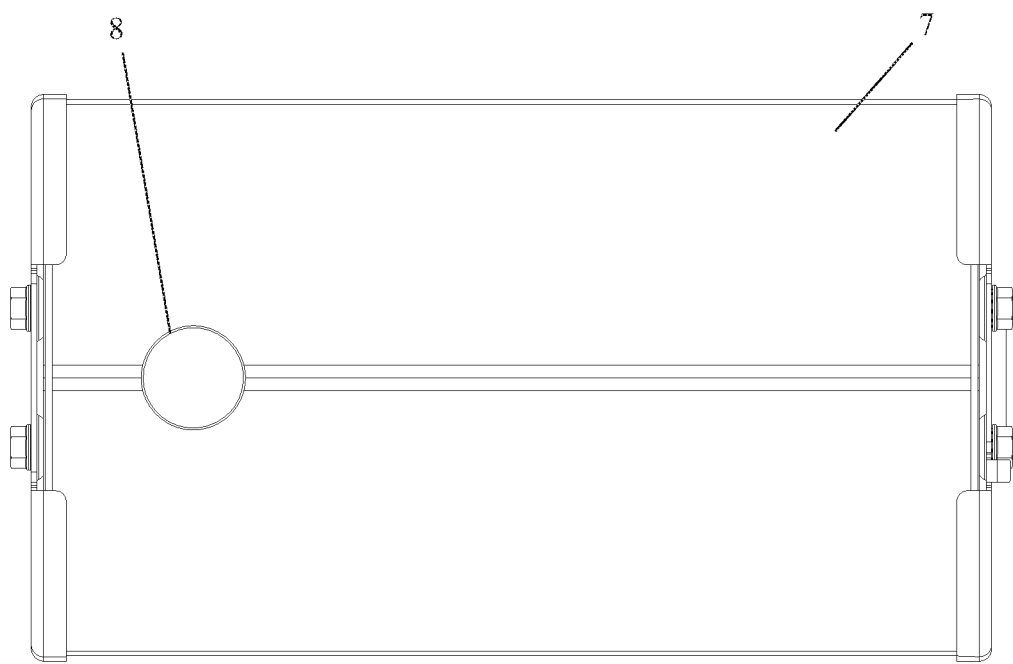
FIG. 12 is a plan view of the second housing of FIG. 11.
Figure 13:
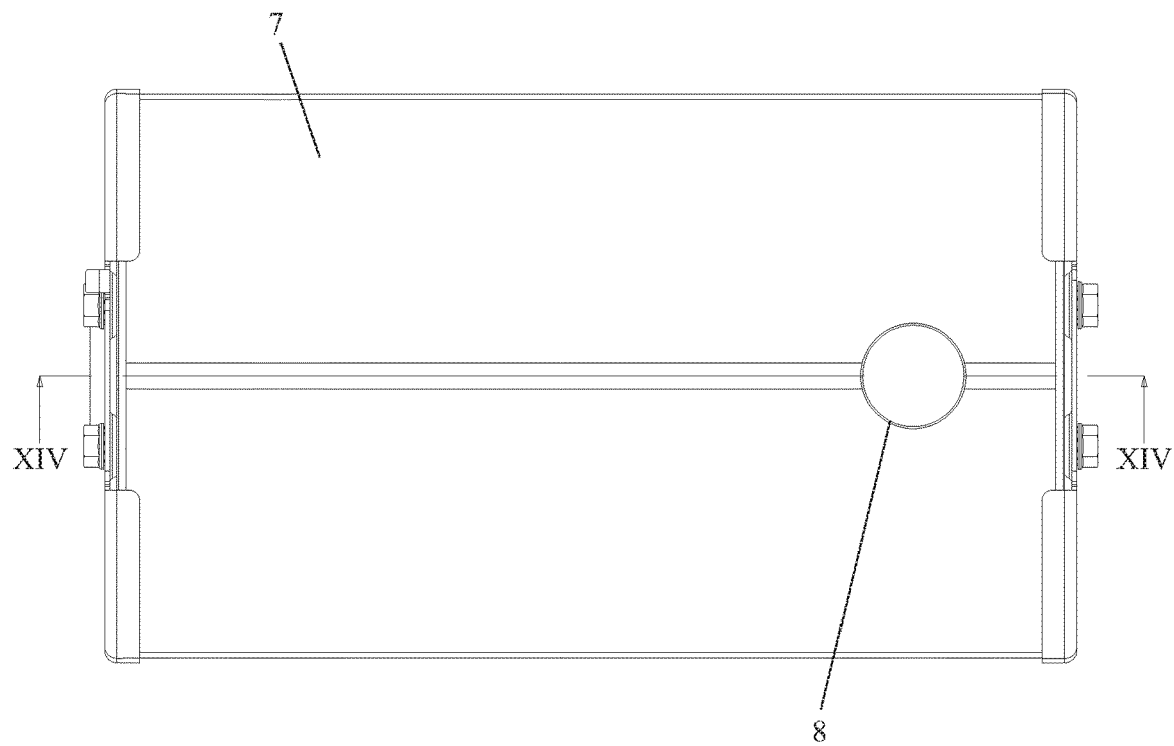
FIG. 13 is a further plan view of the second housing of FIG. 11 indicating a section plane.
Figure 14:
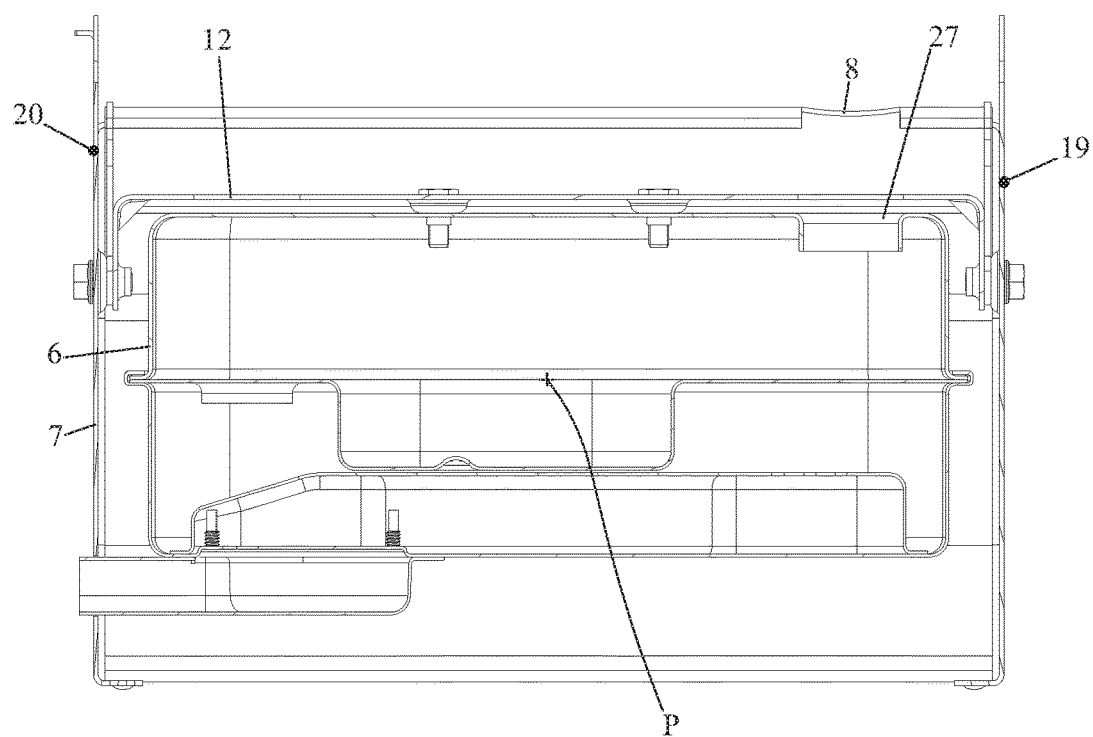
FIG. 14 is a section view of the second housing and of the muffler of FIG. 13 along the section plane XIV-XIV of FIG. 13.

FIG. 9 shows a section view according to the section plane IX-IX (FIG. 8) through the second housing 7 in direction perpendicular to the travel direction 50. FIG. 10 shows a section view according to the section plane X-X (FIG. 8) through the second housing 7 in a direction perpendicular to the axial direction 47.

The riding lawn mower 1 comprises a support 12. The support 12 is fastened to the second housing 7. The support 12 carries the muffler 3. The support 12 is arranged inside the second housing 7. The second housing 7 encloses the support 12 as well as the first housing 6 at least partially. As illustrated in FIG. 9, the support 12 in a section view perpendicular to the travel direction 50 is substantially U-shaped. The support 12 comprises legs 21 and 22. The legs of the U are formed by the legs 21 and 22 of the support 12. The leg 21 of the support 12 is fastened to the side part 19 of the wall 17 of the second housing 7. For this purpose, a screw 23 is screwed through the side part 19 into the leg 21 of the support 12. In an analogous manner, the leg 22 of the support 12 is fastened to the side part 20 of the wall 17 of the second housing 7. For this purpose, a screw 24 is screwed through the side part 20 into the leg 22. The legs 21 and 22 of the support 12 are connected to each other by a connecting part 25 of the support 12. The connecting part 25 extends along the axial direction 47. The first housing 6 of the muffler 3 is fastened with its top side to the connecting part 25 of the support 12. For this purpose, screws 26 are screwed through the connecting part 25 into the first housing 6 of the muffler 3. The first housing 6 is arranged below the connecting part 25 of the support 12 relative to the vertical direction 48. The first housing 6 of the muffler 3 is suspended from the support 12.

As illustrated in FIGS. 9 and 10, a point P is arranged in the interior of the first housing 6 of the muffler 3. The first housing 6 encloses the point P. The point P can be arranged at any location in the interior of the first housing 6. In the embodiments, the point P is the center of gravity of the first housing 6. As can be seen when looking at FIGS. 4, 9, and 10 together, the second housing 7 encloses the first housing 6 such that the second housing 7 with respect to the point P covers a solid angle range of at least 70%, in the embodiment of at least 90%, of the entire solid angle. The point P forms the angle apex of the solid angle. The covered solid angle range is not continuous and comprises individual open locations. The entire solid angle amounts to $4\pi$ sr. Accordingly, the second housing 7 with respect to the point P covers a solid angle range of at least $2.8\pi$ sr, in the embodiment of at least $3.6\pi$ sr. The term "cover" means in this context that a straight line originating at the point P intersects first the first housing 6 of the muffler 3 and then the second housing 7. A part of the second housing 7 which is intersected by such a straight line covers the first housing 6. In this context, no contact between the first housing 6 and the second housing 7 is required. A virtual sphere comprises the point P as a center point of the sphere. A cover part of this virtual sphere is intersected by such straight lines that intersect the first housing 6 as well as the second housing 7. The cover part of the sphere represents a covering surface of the entire sphere surface. The covering surface amounts to at least 70%, in the embodiment at least 90%, of the entire sphere surface.

The second housing 7 completely encloses the first housing 6 with the exception of the openings 8 and 9 for the connecting lines 4 and 5 and the opening 10 for the exhaust gas outlet 11. The screws 23 and 24 for attaching the support 12 to the second housing 7 are part of the second housing 7.

The first housing 6 comprises an inlet opening 27 and an inlet opening 28. Through the inlet openings 27, 28, exhaust gases from the internal combustion engine 2 can be guided through the connecting lines 4, 5 into the first housing 6 of the muffler 3. For this purpose, the connecting line 4 illustrated in FIG. 2 penetrates the opening 8 in the second housing 7 as well as the inlet opening 27 of the first housing 6. The connecting line 5 penetrates the opening 9 of the second housing 7 as well as the inlet opening 28 of the first housing 6. The exhaust gases of the internal combustion engine 2 are guided through the connecting lines 4, 5 through the second housing 7 into the first housing 6 of the muffler 3.

The first housing 6 comprises an exhaust gas opening 29. Exhaust gases can exit from the first housing 6 of the muffler 3 through the exhaust gas opening 29 of the first housing 6. The exhaust gas outlet 11 connects the exhaust gas opening 29 of the first housing 6 to the opening 10 of the second housing 7. Exhaust gases from the first housing 6 are guided via the exhaust gas outlet 11 through opening 10 out of the second housing 7. The exhaust gas outlet 11 is a connecting line. The exhaust gas outlet 11 comprises a tubular cross section. In the muffler 3, the exhaust gases are guided in a meandering fashion from the inlet openings 27, 28 to the exhaust gas opening 29. In doing so, the exhaust gases are decelerated and cooled at inner walls of the muffler 6 that are embodied in a meander shape. This leads to a reduction of the noise emission.

As illustrated in FIG. 10, an insulation distance a is existing between the first housing 6 of the muffler 3 and the second housing 7. The insulation distance a corresponds to the smallest distance between the first housing 6 and the second housing 7. The insulation distance a is measured perpendicularly to the wall 17 of the second housing 7. The insulation distance a is provided between the center part 18 of the wall 17 of the second housing 7 and the first housing 6.

The first housing 6 comprises a vertical height h when positioning the riding lawn mower 1 on the horizontal plane E. The insulation distance a amounts to at least 5%, in the embodiments at least 10%, of the vertical height h. The insulation distance a amounts to at least 5 mm, in the embodiments at least 8 mm. The second housing 7 comprises an exterior side 15 and an inner side 16. The exterior side 15 is at the same time the exterior side of the wall 17 of the second housing 7. The inner side 16 is at the same time the inner side of the wall 17 of the second housing 7. The exterior side 15 is facing away from the muffler 3. The inner side 16 of the second housing 7 is facing the first housing 6 of the muffler 3. The insulation distance a is measured perpendicularly to the inner side 16 of the wall 17 of the second housing 7.

The top side 13 of the second housing 7 is formed by a deflection surface 14. The deflection surface 14 serves for preventing accumulation of cut material. The deflection surface 14 is at least partially rounded. The deflection surface 14 is at least partially a convex surface. The deflection surface 14 is formed by the central part 18 of the wall 17 of the second housing 7 at the exterior side 15 of the second housing 7.

The wall 17 of the second housing 7 extends in a closed configuration about the axial direction 47. The wall 17 is formed by two half shells. The two half shells are contacting each other in the region of a central longitudinal plane M. When positioning the riding lawn mower 1 on the horizontal plane E, the central longitudinal plane M extends perpendicularly to the horizontal plane E. The central longitudinal plane M is a symmetry plane of the wall 17. The half shells of the wall 17 are mirror-symmetrical in relation to the central longitudinal plane M. Each one of the two half shells of the wall 17 is convex at the top side 13 of the second housing 7. The half shells are convex at the highest point in relation to the vertical direction 48 when viewing the second housing 7 from its exterior side 15. Due to the convex configuration of the top side 13 of the second housing 7, cut material is deflected by the deflection surface 14. When positioning the riding lawn mower 1 on the horizontal plane E, cut material applied to the deflection surface 14 slides off the deflection surface 14 to the ground of the horizontal plane E.

The second housing 7 comprises at its exterior side 15 an emissivity of greater than 0.8, in the embodiment of greater than 0.9. The second housing 7 is black at its exterior side. The second housing 7 comprises at its inner side 16 an emissivity of less than 0.25, in the embodiments of less than 0.15. The wall 17 of the second housing 7 that is comprised of aluminum is uncoated at the inner side 16 of the second housing 7. In this way, the absorption of thermal radiation is very minimal. The second housing 7 absorbs at its inner side 16 heat by thermal radiation only to a minimal degree. At its exterior side 15, the second housing 7 dissipates heat very quickly due to the black coating of the exterior side 15. In this way, the temperature of the second housing 7 is comparatively low.

FIGS. 11 to 14 show an alternative embodiment of the first housing 6 and of the second housing 7. In the second housing 7 according to FIGS. 11 to 14, the opening 9 provided in the second housing 7 in accordance with FIGS. 1 to 10, is closed off. In the embodiment according to FIGS. 11 to 14, the second housing 7 comprises only the opening 8 for the connecting line 4. The opening 8 comprises a smaller distance relative to the side part 19 of the wall 17 of the second housing 7 than to the side part 20 of the wall 17 of the second housing 7. Analogously, the alternative first housing 6 illustrated in FIG. 14 has no inlet opening 28 compared to the first housing 6 according to FIGS. 1 through 10. The first housing 6 according to the embodiment of FIG. 14 comprises only the inlet opening 27 for the connecting line 4. The inlet opening 27 comprises a smaller distance relative to the side part 19 of the wall 17 of the second housing 7 than relative to the side part 20 of the wall 17 of the second housing 7.

The first housing 6 and the second housing 7 according to FIGS. 11 to 14 are provided for an internal combustion engine 2 with only one cylinder and correspondingly only one connecting line 4. A riding lawn mower 1 with a first housing 6 and with a second housing 7 according to FIGS. 11 to 14 comprises only the connecting line 4 and does not comprise additionally the connecting line 5.

Otherwise, the description of the first housing 6, of the second housing 7, and of the riding lawn mower 1 according to FIGS. 1 through 10 applies identically to the embodiment of the first housing 6, the second housing 7, and the riding lawn mower 1 according to FIGS. 11 to 14.

Since the second housing 7 encloses the first housing 6 at least partially and at its exterior side 15 has an emissivity of 0.8 or of 0.9, the maximal temperature at the exterior side 15 of the second housing 7 in operation of the riding lawn mower 1 in both embodiments is limited to below 250° C. This applies also for operation of the riding lawn mower 1 at full load. Ignition temperatures of hay are between 260° and 310°. Therefore, the risk of ignition of dry cut material is minimized by the invention.

The specification incorporates by reference the entire disclosure of European priority document 20 152 432.9 having a filing date of Jan. 17, 2020.

While specific embodiments of the invention have been shown and described in detail to illustrate the inventive principles, it will be understood that the invention may be embodied otherwise without departing from such principles.

What is claimed is:

1. A riding lawn mower comprising:
    an internal combustion engine;
    a muffler comprising a first housing, wherein the internal combustion engine is connected to the muffler to supply exhaust gases originating from the internal combustion engine to the first housing of the muffler for noise damping of the exhaust gases;
    a second housing configured to thermally insulate the first housing of the muffler, wherein the second housing at least partially encloses the first housing of the muffler, and wherein the second housing comprises an exterior side comprising an emissivity of greater than 0.8;
    wherein the second housing comprises an inner side facing the first housing of the muffler and wherein the inner side comprises an emissivity of less than 0.25.

2. The riding lawn mower according to claim 1, wherein the emissivity of the exterior side is greater than 0.9.

3. The riding lawn mower according to claim 1, wherein the second housing encloses the first housing of the muffler such that the second housing, relative to a point inside the first housing of the muffler, covers a solid angle range of at least 70% of an entire solid angle.

4. The riding lawn mower according to claim 3, wherein the solid angle range amounts to at least 90% of the entire solid angle.

5. The riding lawn mower according to claim 1, wherein the second housing completely encloses the first housing of the muffler with the exception of at least one opening of the second housing configured to connect to at least one connecting line connecting the internal combustion engine to the muffler and with the exception of an opening of the second housing configured to connect to an exhaust gas outlet of the muffler.

6. The riding lawn mower according to claim 1, wherein an insulation distance is provided between the first housing of the muffler and the second housing.

7. The riding lawn mower according to claim 6, wherein the first housing of the muffler, when positioning the riding lawnmower on a horizontal plane, comprises a vertical height, and wherein the insulation distance is measured perpendicularly to a wall of the second housing and amounts to at least 5% of the vertical height.

8. The riding lawn mower according to claim 7, wherein the insulation distance measured perpendicularly to the wall of the second housing amounts to at least 10% of the vertical height.

9. The riding lawn mower according to claim 6, wherein the insulation distance amounts to at least 5 mm.

10. The riding lawn mower according to claim 9, wherein the insulation distance amounts to at least 8 mm.

11. The riding lawn mower according to claim 1, further comprising a support connected to the second housing, wherein the support carries the muffler.

12. The riding lawn mower according to claim 1, wherein the second housing comprises a top side, wherein the top side is a deflection surface configured to prevent accumulation of cut material on the second housing.

13. The riding lawn mower according to claim 12, wherein the deflection surface is at least partially rounded.

14. The riding lawn mower according to claim 12, wherein the deflection surface is an at least partially convex surface.

15. The riding lawn mower according to claim 1, wherein the second housing comprises an exterior side and the exterior side is black.

16. The riding lawn mower according to claim 1, wherein the emissivity of the inner side is less than 0.15.

17. The riding lawn mower according to claim 1, wherein the second housing comprises an opening configured to connect to an exhaust gas outlet of the muffler, wherein the opening is arranged laterally, when viewed in a travel direction of the riding lawn mower.

18. The riding lawn mower according to claim 1, wherein the internal combustion engine is connected by at least one connecting line to the muffler.

19. A riding lawn mower comprising:
an internal combustion engine;
a muffler comprising a first housing, wherein the internal combustion engine is connected to the muffler to supply exhaust gases originating from the internal combustion engine to the first housing of the muffler for noise damping of the exhaust gases;
a second housing configured to thermally insulate the first housing of the muffler, wherein the second housing at least partially encloses the first housing of the muffler, and wherein the second housing comprises an exterior side comprising an emissivity of greater than 0.8, wherein a wall of the second housing is comprised of aluminum;
wherein the wall of the second housing comprises an inner side without a coating, wherein the inner side is facing the first housing of the muffler.

* * * * *